United States Patent Office 3,200,155
Patented Aug. 10, 1965

3,200,155
COMPLETELY N-HYDROXYALKYLATED AND COMPLETELY N - POLYOXYALKYLATED POLYHEXAMETHYLENE POLYAMINES
Willard H. Kirkpatrick, Sugar Land, and Virgil L. Seale and Robert E. Law, Houston, Tex., assignors to Nalco Chemical Company, a corporation of Delaware
No Drawing. Filed Mar. 9, 1961, Ser. No. 94,443
8 Claims. (Cl. 260—584)

This invention, in general, relates to new and useful chemical compounds and processes for producing said compounds. More particularly, the invention relates to N-substituted polyhexamethylene polyamines wherein the N-substituents are hydroxyalkyl groups and/or polyoxyalkylene groups.

It is an object of the invention to provide new and useful N-substituted polyhexamethylene polyamines.

Another object of the invention is to provide novel processes for producing N-substituted polyhexamethylene polyamines.

A more particular object of the invention is to provide new and useful N-(hydroxy lower alkyl) polyhexamethylene polyamines.

Another more specific object of the invention is to produce new and useful N-polyoxyalkylene polyhexamethylene polyamines wherein the polyoxyalkylene groups contain oxyethylene groups, oxypropylene groups, and/or oxybutylene groups. Other objects of the invention will be apparent to those skilled in the art in the following description of the invention.

In accordance with the invention, the N-hydroxyalkylene polyhexamethylene polyamines, such as bis-(hexamethylene)triamine or higher homologs thereof, e.g., tris-(hexamethylene) tetramine, are produced by the oxyalkylation, in the absence of an alkaline polyoxyalkylation catalyst, with a 1,2-lower alkylene oxide, such as, ethylene oxide, 1,2-propylene oxide, 1,2-butylene oxide, 2,3-butylene oxide or mixtures thereof. The alkylene oxide and polyamine are reacted in a ratio of at least one mol alkylene oxide per mol of the polyamine up to an amount not substantially exceeding in mols of alkylene oxide the product of the total mols of the polyamine times the average number of hydrogens on amino nitrogens in the polyamine. The N-hydroxy alkylene polyhexamethylene polyamines may contain as low as one hydroxyalkyl group per mol of polyamine, as high as one hydroxyalkyl group per amino hydrogen in the polyamine reactant, or amounts intermediate therebetween. The addition of the alkylene oxide primarily occurs first at the primary amino nitrogens of the polyamine. After one hydroxy alkylene group is added at each primary amino nitrogen, all of the amino nitrogens are believed to compete on a substantially equal basis for the remaining alkylene oxide, if any, so that the reaction produces in all likelihood an isometric mixture up to the point where the amino groups are completely hydroxyalkylated.

The polyoxyalkylation reaction is conducted in two stages. In the first stage a N-hydroxyalkylated polyhexamethylene polyamine is produced by the reaction previously described in a mol ratio of mol of alkylene oxide to polyamine which will yield the desired number of hydroxyalkyl groups. When this reaction is complete, or at least substantially complete, an alkaline polyoxyalkylation catalyst such as sodium hydroxide, potassium hydroxide, or the like is added in an amount in the range of about 0.5–3% hydroxyalkylated polyamine. Additional alkylene oxide, either ethylene oxide, 1,2-propylene oxide, or 1,2- or 2,3-butylene oxide or ethylene oxide plus either 1,2-propylene oxide or a butylene oxide, or 1,2-propylene oxide plus a butylene oxide, as mixtures or in sequential order, is pressured into the reaction vessel and circulated until substantially all of the alkylene oxide is reacted. The first polyoxyalkylation reaction occurs at the hydroxyl group of the hydroxyalkylated polyhexamethylene polyamine, especially at the primary hydroxyl group of the N-hydroxy ethyl groups, provided that all of the amino hydrogens have been hydroxyalkylated. In such reaction, the most reactive groups are the primary hydroxy groups. The second most reactive groups are the secondary hydroxy groups, especially where the alkylene oxide used for polyoxyalkylation is ethylene oxide.

In those instances where the amino hydrogens are not completely adducted and in the absence of a catalyst, the amino hydrogen is the most reactive grouping with the primary amino hydrogen more active than the secondary amino hydrogen. With such a composition in the presence of catalyst the differences in reactivity of the various groups is minimized so that any reaction product is a random mixture of adducts.

The hydroxyalkylation reaction preferably is conducted at a temperature in the range of about 95–125° C. with the exclusion of atmospheric oxygen. The reaction ordinarily is conducted under superatmospheric pressure in which an inert gas, such as nitrogen, methane, ethane, natural gas or the like may be mixed with the gaseous alkylene oxide. The pressures employed are ordinarily in the range of 10–100 p.s.i.g. The polyoxyalkylation reaction is usually conducted at a somewhat higher temperature, ordinarily in the range of about 140–165° C. The polyoxyalkylation pressure in the reaction vessel is ordinarily within the range of 10–100 p.s.i.g.

The polyhexamethylene polyamines have the general formula $H_2N[(CH_2)_6NH]_x (CH_2)_6NH_2$ wherein $x$ is a small integer, e.g., 1, 2 or 3. The polyhexamethylene polyamine may be a substantially pure compound or it may consist of mixtures of various homologs in the polyhexamethylene polyamine series.

The compounds produced in accordance with the invention have the general formula

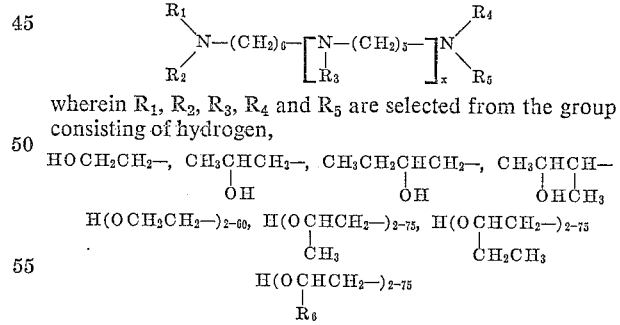

wherein $R_1$, $R_2$, $R_3$, $R_4$ and $R_5$ are selected from the group consisting of hydrogen, $HOCH_2CH_2—$, $CH_3CHCH_2—$, $CH_3CH_2CHCH_2—$, $CH_3CHCH—$
                    |                |                  | |
                    OH               OH                 OH CH_3

$H(OCH_2CH_2—)_{2-60}$, $H(OCHCH_2—)_{2-75}$, $H(OCHCH_2—)_{2-75}$
                         |                    |
                         CH_3                  CH_2CH_3

$H(OCHCH_2—)_{2-75}$
          |
          R_6 wherein $R_6$ is one of hydrogen, methyl or ethyl in at least one occurrence and another one of hydrogen, methyl and ethyl in the remainder of occurrences, $x$ is a small integer, and at least one of $R_1$, $R_2$, $R_3$, $R_4$ and $R_5$ is one of the aforedefined groups other than hydrogen.

The 2-hydroxyethyl-1 group is derived from ethylene oxide. The 2-hydroxy propyl-1 group is drived from 1,2-propylene oxide. The 2-hydroxy-n-butyl-1 group is derived from 1,2-butylene oxide. The 2-hydroxy-1-methylpropyl-1 group is derived from 2,3-butylene oxide.

When the hydroxy alkylated polyhexamethylene polyamine is polyoxyethylated, the total mols of ethylene oxide adducted per mol of the polyhexamethylene polyamine preferably does not exceed about 60 mols. It is possible to carry the reaction even further, but there is ordinarily little to be gained in terms of desired properties by exceeding about 60 mols of ethylene oxide per mol of polyamine. A similar situation arises in polyoxypropylation of polyoxybutylation, wherein there is ordinarily little benefit in exceeding about 75 mols of 1,2-propylene oxide or 1,2-butylene oxide per mol of the polyamine.

Where the oxyalkylation reaction involves polyoxyalkylation with at least two oxides, the reaction may take one of two forms. The oxides may be premixed and simultaneously reacted with the hydroxyalkylated polyhexamethylene polyamine. Alternatively, the hydroxyalkylated polyamine may be first either oxybutylated, oxypropylated or oxyethylated and the thus oxyalkylated product further oxyalkylated with another of either butylene oxide, propylene oxide or ethylene oxide to yield a polyoxyalkylated chain in which the different oxyalkylene groups appear in sequential order.

EXAMPLES OF HYDROXYALKYLATION

The following examples relate to specific embodiments of the invention in which a polyhexamethylene polyamine is hydroxyalkylated to various degrees. The parts are by weight unless otherwise indicated.

Example I

Into an autoclave are charged 10.0 parts bis-(hexamethylene) triamine. The temperature is raised to 90–100° C. and the autoclave contents are thoroughly purged with an inert gas such as nitrogen or purified natural gas; then 2.05 parts ethylene oxide are added at such a rate to maintain 100–120° C. and 30–50 p.s.i.g. After completion of the ethylene oxide addition, agitation of the autoclave contents is continued at 100–120° C. until the pressure reaches a constant level to produce the one mol ethylene oxide adduct, with the primary product having the formula $HOCH_2CH_2NH(CH_2)_6NH(CH_2)_6NH_2$.

Example II

In a manner similar to that of Example I, 10.0 parts of bis-(hexamethylene) triamine are reacted with 4.1 parts ethylene oxide to produce the two mol ethylene oxide adduct with the primary product having the formula $HOCH_2CH_2NH(CH_2)_6NH(CH_2)_6NHCH_2CH_2OH$ and/or an isomeric form thereof.

Example III

In a manner similar to that of Example I, 6.5 parts of bis-(hexamethylene) triamine are reacted with 4.0 parts ethylene oxide to produce the three mol ethylene oxide adduct with the primary product having the formula $(HOCH_2CH_2)_2N(CH_2)_6NH(CH_2)_6NHCH_2CH_2OH$ and/or an isomeric form thereof.

Example IV

In a manner similar to that of Example I, 5.0 parts of bis-(hexamethylene) triamine are reacted with 4.1 parts ethylene oxide to produce the four mol ethylene oxide adduct with the primary product having the formula $$(HOCH_2CH_2)_2N(CH_2)_6NH(CH_2)_6N(CH_2CH_2OH)_2$$

and/or an isomeric form thereof.

Example V

In a manner similar to that of Example I, 5.0 parts of bis-(hexamethylene) triamine are reacted with 5.1 parts of ethylene oxide to produce the five mol ethylene oxide adduct with the primary product having the formula $$(HOCH_2CH_2)_2N(CH_2)_6N(CH_2)_6N(CH_2CH_2OH)_2$$
$$\qquad\qquad\qquad |$$
$$\qquad\qquad\quad CH_2CH_2OH$$

Example VI

In a manner similar to that of Example I, 10.0 parts of bis-(hexamethylene) triamine are reacted with 2.7 parts 1,2-propylene oxide to produce the one mol propylene oxide adduct with the primary product having the formula $$CH_3CHCH_2NH(CH_2)_6NH(CH_2)_6NH_2$$
$$\quad |$$
$$\;\, OH$$

Example VII

In a manner similar to that of Example I, 5.0 parts of bis-(hexamethylene) triamine are reacted with 2.7 parts of 1,2-propylene oxide to produce the two mol propylene oxide adduct with the primary product having the formula $$CH_3CHCH_2NH(CH_2)_6NH(CH_2)_6NHCH_2CHCH_3$$
$$\quad |\qquad\qquad\qquad\qquad\qquad\qquad\quad |$$
$$\;\, OH\qquad\qquad\qquad\qquad\qquad\qquad\;\, OH$$

and/or an isomeric form thereof.

Example VIII

In a manner similar to that of Example I, 6.2 parts of bis-(hexamethylene) triamine are reacted with 5.0 parts of 1,2-propylene oxide to produce the three mol propylene oxide adduct with the primary product having the formula $$(CH_3CHCH_2)_2N(CH_2)_6NH(CH_2)_6NHCH_2CHCH_3$$
$$\quad |\qquad\qquad\qquad\qquad\qquad\qquad\qquad\; |$$
$$\;\, OH\qquad\qquad\qquad\qquad\qquad\qquad\quad OH$$

and/or an isomeric form thereof.

Example IX

In a manner similar to that of Example I, 5.0 parts of bis-(hexamethylene) triamine are reacted with 5.4 parts 1,2-propylene oxide to produce the four mol propylene oxide adduct with the primary product having the formula $$(CH_3CHCH_2)_2N(CH_2)_6NH(CH_2)_6N(CH_2CHCH_3)_2$$
$$\quad |\qquad\qquad\qquad\qquad\qquad\qquad\quad |$$
$$\;\, OH\qquad\qquad\qquad\qquad\qquad\qquad OH$$

and/or an isomeric form thereof.

Example X

In a manner similar to that of Example I, 4.0 parts of bis-(hexamethylene) triamine are reacted with 5.4 parts of 1,2-propylene oxide to produce the five mol propylene oxide adduct with the primary product having the formula $$[CH_3CH(OH)CH_2]_2N(CH_2)_6N(CH_2)_6N[CH_2CH(OH)CH_3]_2$$
$$\qquad\qquad\qquad\qquad\quad |$$
$$\qquad\qquad\qquad\quad CH_2CH(OH)CH_3$$

Example XI

In a manner similar to that of Example I, 6.0 parts of bis-(hexamethylene) triamine are reacted with 2.0 parts 1,2-butylene oxide to produce the one mol 1,2-butylene oxide adduct with the primary product having the formula $$CH_3CH_2CHCH_2NH(CH_2)_6NH(CH_2)_6NH_2$$
$$\qquad\;\; |$$
$$\qquad OH$$

Example XII

In a manner similar to that of Example I, 6.0 parts of bis (hexamethylene) triamine are reacted with 4.0 parts 1,2-butylene oxide to produce the two mol 1,2-butylene oxide adduct with the primary product having the formula $$CH_3CH_2CHCH_2NH(CH_2)_6NH(CH_2)_6NHCH_2CHCH_2CH_3$$
$$\qquad\;\; |\qquad\qquad\qquad\qquad\qquad\qquad\qquad\qquad |$$
$$\qquad OH\qquad\qquad\qquad\qquad\qquad\qquad\qquad\; OH$$

and/or an isomeric form thereof.

Example XIII

In a manner similar to that of Example I, 5.0 parts of bis-(hexamethylene) triamine are reacted with 5.0 parts 1,2-butylene oxide adduct with the primary product having the formula

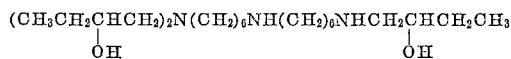

and/or an isomeric form thereof.

Example XIV

In a manner similar to that of Example I, 5.0 parts of bis-(hexamethylene) triamine are reacted with 6.5 parts 1,2-butylene oxide to produce the four mol 1,2-butylene oxide adduct with the primary product having the formula

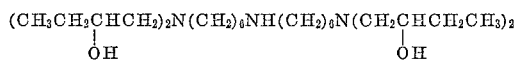

and/or an isomeric form thereof.

Example XV

In a manner similar to that of Example I, 3.0 parts of bis-(hexamethylene) triamine are reacted with 5.0 parts 1,2-butylene oxide to produce the five mol 1,2-butylene oxide adduct with the primary product having the formula

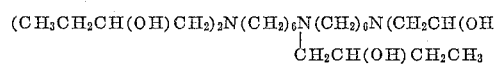

Example XVI

In a manner similar to that of Example I, 10.0 parts of bis-(hexamethylene) triamine are reacted with 2.4 parts of a mixture comprised of equal parts by weight of ethylene oxide and 1,2-propylene oxide to produce the one mol mixed oxide adduct.

Example XVII

In a manner similar to that of Example I, 10.0 parts of bis-(hexamethylene) triamine are reacted with 4.8 parts of a mixture comprised of equal parts by weight of ethylene oxide and 1,2-propylene oxide to produce the two mol mixed oxide adduct.

EXAMPLES OF POLYOXYALKYLATION

The following examples illustrate specific embodiments of the invention in which the polyhexamethylene polyamine contains a chain of at least two oxyethylene and/or oxypropylene groups. The parts are by weight unless otherwise indicated.

Example XVIII

In a manner similar to that of Example I, 2.0 parts of bis-(hexamethylene) triamine are reacted with 2.0 parts ethylene oxide to produce the adduct described in Example V. The autoclave is then opened and an alkaline catalyst such as sodium hydroxide is added to the contents in an amount equivalent to 0.5–1.0% of the charge. After purging with an inert gas the temperature is increased to 150° C. and an additional 14.4 parts ethylene oxide are added to produce the forty mol ethylene oxide adduct with the primary product having the formula

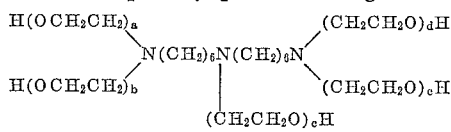

wherein the sums of the average amounts for $a$, $b$, $c$, $d$ and $e$ approximate 40.

Example XIX

In a manner similiar to that of Example I, 2.0 parts of bis-(hexamethylene) triamine are reacted with 2.7 parts 1,2-propylene oxide to produce the adduct described in Example X. This adduct is further reacted in a manner similar to that described in Example XVIII with 24.3 parts 1,2-propylene oxide to produce the fifty mol propylene oxide adduct with the primary product having the formula

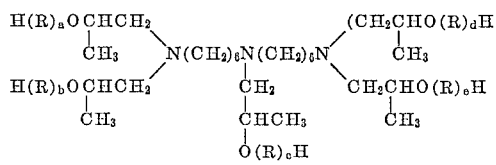

wherein R is

and the sum of the average amounts of $a$, $b$, $c$, $d$ and $e$ approximates 50.

Example XX

In a manner similar to that of Example I, 4.0 parts of bis-(hexamethylene) triamine are reacted with 5.4 parts 1,2-propylene oxide to produce the adduct described in Example X. This adduct is further reacted in a manner similar to that described in Example XVIII with 4.1 parts ethylene oxide to produce the sequential five mol ethylene oxide adduct with the primary product having the formula

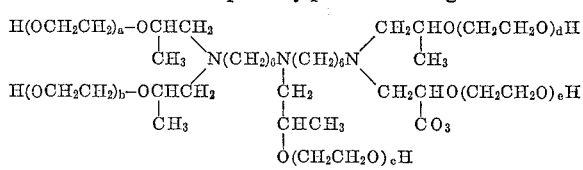

wherein the sum of the average amounts for $a$, $b$, $c$, $d$, and $e$ approximates five.

Example XXI

In a manner similar to that of Example I, 10.0 parts of a crude bis-(hexamethylene) triamine (Du Pont Amine 248) containing in excess of 25% of higher polyhexamethylene polyamines are reacted with 2.1 parts ethylene oxide to produce the approximate one mol ethylene oxide adduct.

Example XXII

In a manner similar to that of Example I, 10.0 parts of a crude bis-(hexamethylene)triamine such as described in Example XXI are reacted with 6.5 parts ethylene oxide to produce the approximate three mol ethylene oxide adduct. This adduct is further reacted in a manner similar to the last step described in Example XVIII with 11.0 parts 1,2-propylene oxide to produce the sequential five mol propylene oxide adduct.

It will be seen from the foregoing description of the examples that the invention herein described is adapted to produce a wide variety of compounds. One of the advantages of this invention lies in its adaptability in producing a wide variety of compounds of various polarities. The hydroxyethyl group with its primary hydroxy group is more reactive than the secondary hydroxy groups produced in hydroxyalkylation with 1,2-propylene oxide and the butylene oxides. The polyoxyethylene groups have a greater hydrophilicity than the polyoxypropylene groups under equal degrees of oxyalkylation. Furthermore, the hydrophilic-hydrophobic balance in the molecule can be adjusted to the required balance by utilizing polyoxyalkylene chains containing both oxyethylene and oxypropylene groups as well as both oxyethylene and oxybutylene groups. Where the polyoxyalkylation is done with both oxides in sequential order, the groups on the terminal end of the polyoxyalkylene chain will ordinarily have greater influence on the hydrophilic-hydrophobic balance than the groups positioned adjacent the polyamine nucleus. Another variable of the invention is that there may be left some free amine groups, which may be desirable where favorable properties imparted by free amine groups, such as the corrosion inhibition of ferrous metals.

The compounds prepared in accordance with the invention are suitable for use as intermediates for various types of organic synthesis, as cross-linking agents in polyurethane resins, and as intermediates in the preparation of surface-active compounds used as detergents on emulsifiers. For example, they are readily adapted to be used as intermediates for the manufacture of surface-active esters of carboxy acids because the primary hydroxyl group reacts readily with organic carboxy acids such as long chain fatty acids as well as the dicarboxy acids including diglycolic acid, maleic anhydride, and phthalic anhydride. The hydroalkylated compounds of the present invention can also be employed as starting materials for oxyalkylation reactions in which long chains composed of oxyalkylene groups are added to the hydroxyl groups of such starting materials. Thus, by starting with the compound of Example I in the presence of an alkaline catalyst such as sodium hydroxide or sodium methylate and adding 1,2-propylene oxide, long chains can be built up on the terminal hydroxyl groups to give compositions having a molecular weight of 1200 to 4000 attributable to oxypropylene groups. These compounds can be employed in proportions of 1 part of said compound to from 2000 to 50,000 parts of a water-in-oil petroleum emulsion for the purpose of breaking such emulsion and effecting separation of the water from the oil. Similar demulsifiers can be prepared by said polyoxypropylation technique from hydroxyalkylated compounds of the other examples.

The compounds of this invention which contain more than one hydroxyl group can be employed in producing polyurethane products. Such products are obtained by reacting the polyol compound of this invention, especially those containing primary hydroxyl groups, with an amount of organic polyisocyanate, especially diisocyanate, in excess of that required to react with the hydroxyl groups of the initial polymer. This results in the production of a prepolymer containing terminal isocyanate groups, which by reaction with glycols can be converted to reactive urethane groups, which, in turn, react with isocyanate groups to produce cross-linked high molecular weight polyurethanes.

Where the hydroxyalkyl groups consist of both hydroxyethyl and hydroxypropyl or hydroxybutyl, it is possible to take advantage of the difference in reactivity of the primary hydroxyl in the hydroxyethyl group as against the reactivity of the secondary hydroxyl groups in the other hydroxyalkyl radicals. The reaction to form the prepolymer can be carried out under conditions where primarily the primary hydroxy groups react followed by more severe reaction conditions in which the secondary hydroxy groups will react. In such an instance it is possible to use the compounds of the invention containing two types of hydroxyl groups as the polyol in the formation of the prepolymer with diisocyanate followed by the conventional cure with glycols to produce cross-linked products. It is also possible to utilize the compounds of the invention to supply the hydroxyl groups for the cross-linking function.

The invention is hereby claimed as follows:

1. A N-substituted polyhexamethylene polyamine having the formula

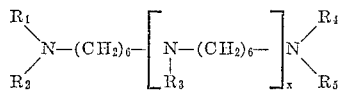

wherein $R_1$, $R_2$, $R_3$, $R_4$, and $R_5$ are selected from the group consisting of only one of $HOCH_2CH_2-$, $CH_3CHCH_2-$, $CH_3CH_2CHCH_2-$, $CH_3CHCH-$,
                 |                   |                     | |
                 OH               OH            OH CH$_3$ $H(OCH_2CH_2-)_{2-60}$, $H(OCHCH_2-)_{2-75}$, $H(OCHCH_2-)_{2-75}$
                                    |                  |
                                    CH$_3$              $R_6$ wherein $R_6$ is hydrogen in at least one occurrence and methyl in the remainder of occurrences, and $x$ is a small integer from 1 to 2.

2. A N-substituted polyhexamethylene polyamine having the formula

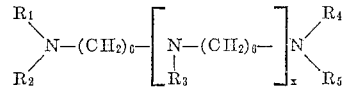

wherein $R_1$, $R_2$, $R_3$, $R_4$ and $R_5$ are each $-CH_2CH_2OH$, and $x$ is a small integer from 1 to 2.

3. A N-substituted polyhexamethylene polyamine having the formula

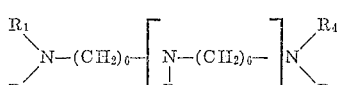

where $R_1$, $R_2$, $R_3$, $R_4$ and $R_5$ are each $-CH_2CHCH_3$
       |
       OH and $x$ is a small integer from 1 to 2.

4. A N-substituted polyhexamethylene polyamine having the formula

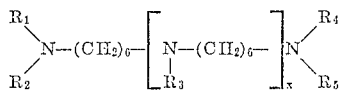

wherein $R_1$, $R_2$, $R_3$, $R_4$ and $R_5$ are each $-CH_2CHCH_2CH_3$
       |
       OH and $x$ is a small integer from 1 to 2.

5. A N-polyoxyalkylated polyhexamethylene polyamine having the formula

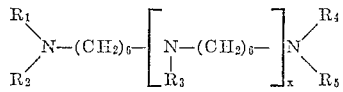

wherein $R_1$, $R_2$, $R_3$, $R_4$ and $R_5$ are each $H(OCH_2CH_2-)_{2-60}$ and $x$ is a small integer from 1 to 2.

6. A N-polyoxyalkylated polyhexamethylene polyamine having the formula

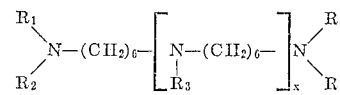

wherein $R_1$, $R_2$, $R_3$, $R_4$ and $R_5$ are each $H(OCH-CH_2-)_{2-75}$
     |
     CH$_3$ and $x$ is a small integer from 1 to 2.

7. A N-polyoxyalkylated polyhexamethylene polyamine having the formula

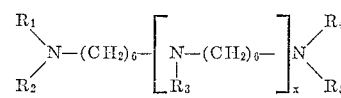

wherein $R_1$, $R_2$, $R_3$, $R_4$ and $R_5$ are each $H(OCHCH_2-)_{2-75}$
   |
   R $x$ is a small integer from 1 to 2, wherein R is selected from the group consisting of hydrogen, methyl and ethyl in at least one occurrence and is another of hydrogen, methyl and ethyl in the remainder of occurrences.

8. A N-hydroxyalkylated bis-(hexamethylene) triamine of the formula

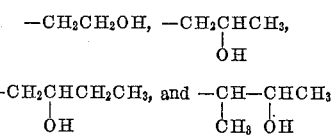

wherein R is selected from the group consisting of only one of

—CH$_2$CH$_2$OH,   —CH$_2$CHCH$_3$,
                       |
                       OH

—CH$_2$CHCH$_2$CH$_3$, and   —CH—CHCH$_3$
       |                      |    |
       OH                    CH$_3$  OH

References Cited by the Examiner

UNITED STATES PATENTS

| | | | |
|---|---|---|---|
| 2,243,329 | 5/41 | De Groote et al. | 260—584 |
| 2,701,239 | 2/55 | Ryznar | 260—584 |
| 2,767,214 | 10/56 | Bersworth | 260—584 |
| 2,817,675 | 12/57 | Hofer | 260—584 |
| 2,901,461 | 8/59 | Auerbach et al. | 260—563 |
| 2,944,030 | 7/60 | Patton | 260—584 |
| 2,944,985 | 7/60 | De Groote et al. | 260—584 |

CHARLES B. PARKER, *Primary Examiner.*

LEON ZITVER, *Examiner.*

UNITED STATES PATENT OFFICE
CERTIFICATE OF CORRECTION

Patent No. 3,200,155                         August 10, 1965

Willard H. Kirkpatrick et al.

It is hereby certified that error appears in the above numbered patent requiring correction and that the said Letters Patent should read as corrected below.

Column 2, lines 44 to 47, the formula should appear as shown below instead of as in the patent:

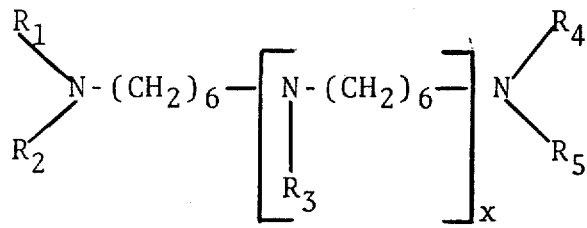

same column 2, line 64, for "drived" read -- derived --; column 5, lines 25 and 26, for that portion of the formula reading "$CH_2CH_3$)" read -- $CH_2CH_3)_2$ --; column 6, lines 26 to to 31, for that portion of the formula reading

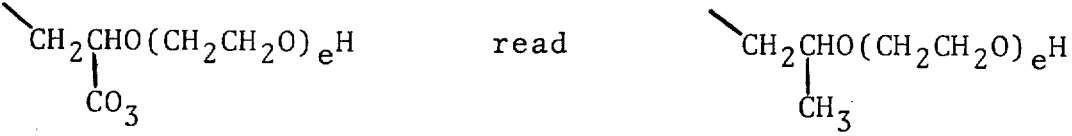

Signed and sealed this 5th day of April 1966.

(SEAL)
Attest:

ERNEST W. SWIDER                       EDWARD J. BRENNER
Attesting Officer                     Commissioner of Patents